No. 617,500. Patented Jan. 10, 1899.
C. EHLING.
HANDLE BAR FOR CYCLES.
(Application filed Mar. 29, 1898.)
(No Model.)

Witnesses:
Paul F. Schilling
[signature]

Inventor:
Carl Ehling
per Gerson y Sachse
his Attorneys.

THE NORRIS PETERS CO., PHOTO-LITHO., WASHINGTON, D. C.

UNITED STATES PATENT OFFICE.

CARL EHLING, OF BREMEN, GERMANY.

HANDLE-BAR FOR CYCLES.

SPECIFICATION forming part of Letters Patent No. 617,500, dated January 10, 1899.

Application filed March 29, 1898. Serial No. 675,566. (No model.)

*To all whom it may concern:*

Be it known that I, CARL EHLING, a subject of the Emperor of Germany, residing at 53 Hohethors Chaussée, Bremen - Neustadt, in the Empire of Germany, have invented new and useful Improvements in and Connected with Handle-Bars for Cycles, of which the following is a specification.

My invention has for its object a new and improved means for raising and lowering the handle-bar while the cycle is in use. The vertical tubular stem of the handle-bar slides in the ordinary manner within the tubular extension of the steering-fork, which extension is split in its upper part and can be tightened by means of a screw in order to grip the stem of the handle-bar and to secure it in the desired position. To prevent the stem of the handle-bar from turning, it slides with one or several grooves on a corresponding number of feathers provided on the inside of the tubular extension of the steering-fork. In order to carry out my invention, I provide a stiff spring within the tubular extension of the steering-fork and rest the lower end of the stem of the handle-bar upon said spring, which tends to force the stem upward. For changing the position of the handle-bar I loosen the tightening-screw and raise or lower the stem into the desired position, thereby allowing the spring to distend or compress it. The tightening-screw is then tightened again.

In order to prevent the handle-bar from being raised by the spring too high out of the tubular extension of the fork, I provide at the upper part of the tube a spring-actuated locking-pin, which, engaging a hole provided near the lower end of the stem of the handle-bar, prevents the stem from being raised farther. For lowering the handle-bar from its highest position this locking-pin has to be drawn out by hand, or if shaped accordingly is pushed outwardly by the beveled edge of the hole in the stem of the handle-bar.

In order to make my invention more readily understood, I have illustrated it on the accompanying sheet of drawings, in which—

Figure 1:
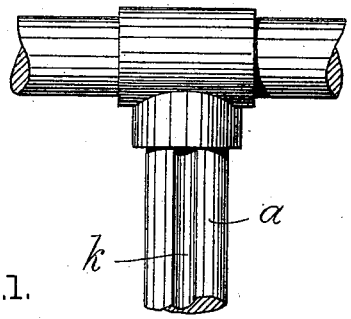
Figure 2:
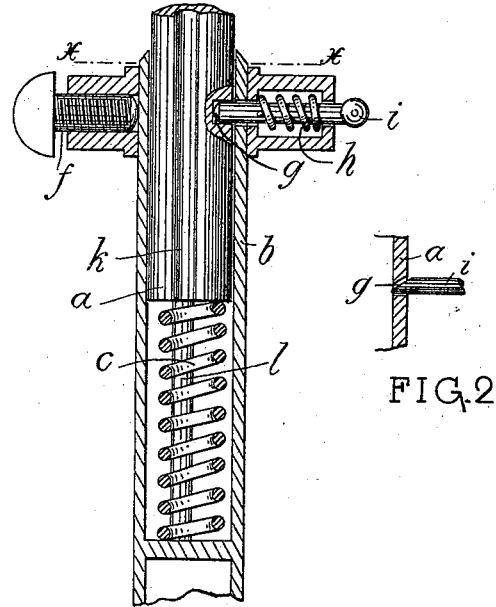
Figure 3:
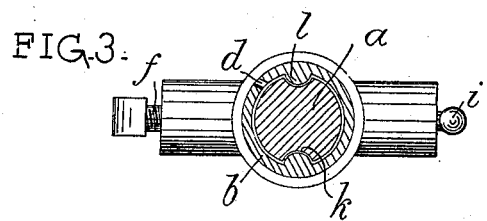

Figure 1 shows a front view of my invention, partly in section. Fig. 2 shows the beveled-off front edge of pin $i$ and the corresponding beveled-off upper edge of hole $g$. Fig. 3 represents a cross-section upon the line $x\ x$ of Fig. 1.

$a$ is the stem of the handle-bar, sliding with grooves $k$ on the feathers $l$, provided on the inner circumference of the tubular extension of the steering-fork $b$.

$c$ is the spring for raising the stem $a$. The upper part of the tube $b$ is split, as at $d$, Fig. 2, and can be tightened around the stem $a$ by means of the tightening-screw $f$.

$i$ is the locking-pin, which by the spring $h$ is pressed toward the stem $a$ and which engages in the highest position of the handle-bar $a$ hole $g$, provided in said stem $a$. The front end of the locking-pin $i$ is preferably beveled off, as shown in Fig. 3, and the upper edge of the hole $g$ is accordingly beveled off.

If a pin $i$, as shown in Fig. 1, is used, this pin has to be drawn out by hand in order to lower the handle-bar from its highest position; but in case a pin with a beveled front end, as shown in Fig. 3, is made use of it will be pushed out of the hole $g$ by the stem $a$ being pressed downwardly.

What I claim, and desire to secure by Letters Patent, is—

1. The combination of a handle-bar-stem-clamping device, formed by the upper part of the tubular extension of the steering-fork being split, the tightening-screw $f$, the stiff spring $c$ provided within the tubular extension of the steering-fork and tending to force the handle-bar stem upward and the grooves and feathers $k$, $l$, as and for the purpose specified.

2. The combination of a handle-bar-stem-clamping device, formed by the upper part of the tubular extension of the steering-fork being split, the tightening-screw $f$, the stiff spring $c$ provided within the tubular extension of the steering-fork and tending to force the handle-bar stem upward, the grooves and feathers $k$, $l$ and a spring-actuated locking-pin $i$, engaging in the highest position of the handle-bar a hole $g$, provided in the lower part of the handle-bar stem, as and for the purpose specified.

3. The combination of a handle-bar-stem-clamping device, formed by the upper part of the tubular extension of the steering-fork being split, the tightening-screw $f$, the stiff spring $c$ provided within the tubular extension of the steering-fork and tending to force the handle-bar stem upward, the grooves and feathers $k$, $l$ and a spring-actuated locking-pin $i$ having a beveled-off front end, engaging in the highest position of the handle-bar a hole $g$, provided in the lower part of the handle-bar stem and having a correspondingly beveled-off upper edge, as and for the purpose set forth.

Dated this 28th day of February, 1898.

CARL EHLING.

Witnesses:
 JOH. W. LÜDEKE,
 CARSTEN LÜDEKE.